No. 833,855. PATENTED OCT. 23, 1906.
R. A. STUART.
COTTON CHOPPER.
APPLICATION FILED JUNE 18, 1906.

2 SHEETS—SHEET 1.

Witnesses
G. R. Thomas
H. B. MacNab

Inventor
R. A. Stuart
By Chandler Chandler
Attorneys

No. 833,855. PATENTED OCT. 23, 1906.
R. A. STUART.
COTTON CHOPPER.
APPLICATION FILED JUNE 18, 1906.

2 SHEETS—SHEET 2.

Witnesses
G. R. Thomas
F. B. MacNab

Inventor
R. H. Stuart
By Chandler & Chandler
Attorneys

UNITED STATES PATENT OFFICE.

RICHARD A. STUART, OF MOUNT GILEAD, NORTH CAROLINA.

COTTON-CHOPPER.

No. 833,855.　　　　　Specification of Letters Patent.　　　　　Patented Oct. 23, 1906.

Application filed June 18, 1906. Serial No. 322,245.

*To all whom it may concern:*

Be it known that I, RICHARD A. STUART, a citizen of the United States, residing at Mount Gilead, in the county of Montgomery, State of North Carolina, have invented certain new and useful Improvements in Cotton-Choppers; and I do hereby declare the following to be a full, clear, and exact description of the invention, such as will enable others skilled in the art to which it appertains to make and use the same.

This invention relates to farm implements, and more particularly to those for use in cotton culture, and has for its object to provide an implement which will knock the stalks and chop them, at the same time loosening the earth, another object being to provide a structure embodying a novel arrangement of parts.

It is to be understood that I do not desire to be limited to the exact details of construction shown and described, for obvious modifications will occur to a person skilled in the art.

Figure 1:
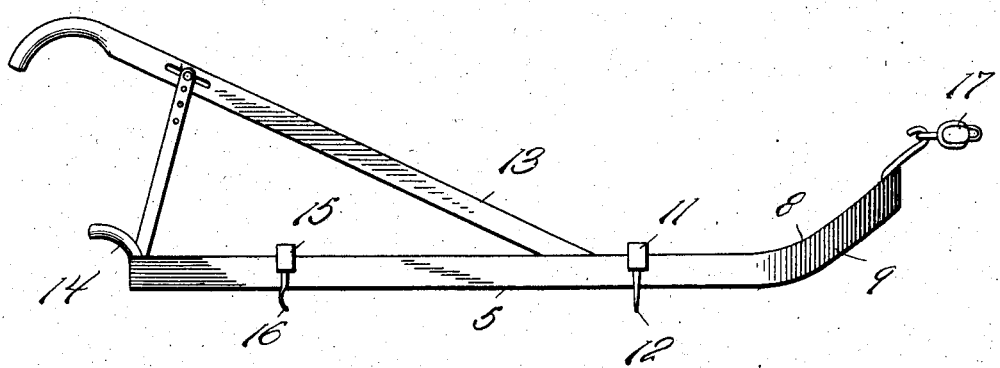
Figure 2:
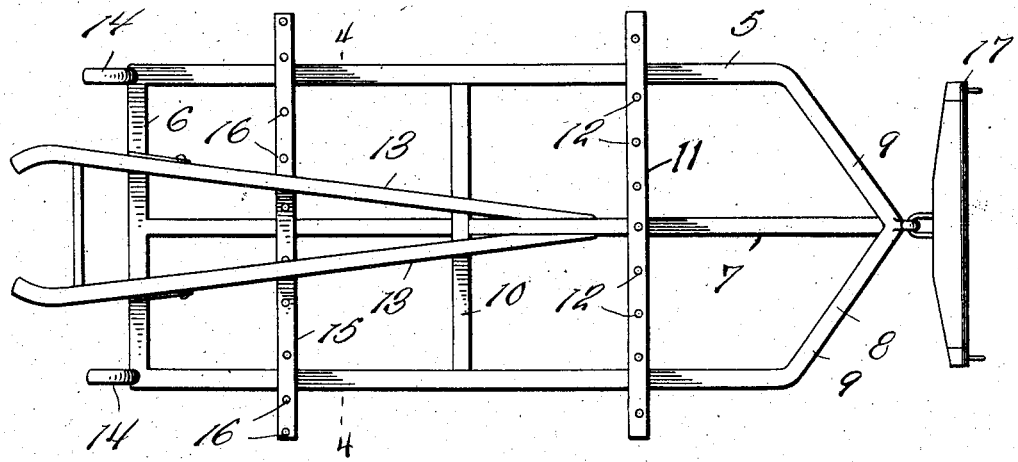
Figure 3:
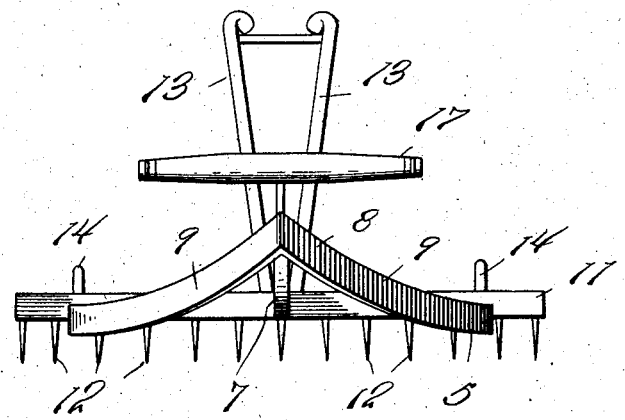
Figure 4:
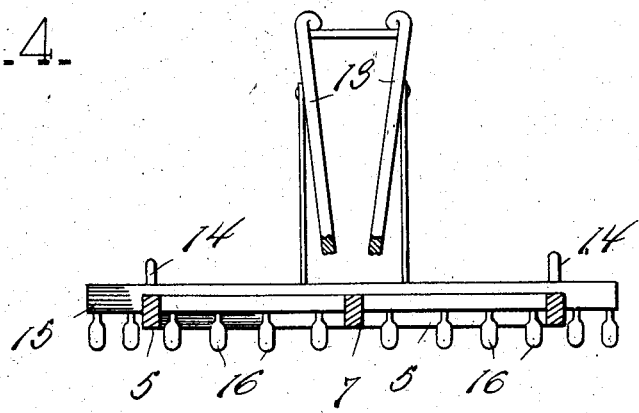

In the drawings forming a portion of this specification, and in which like numerals of reference indicate similar parts in the several views, Figure 1 is a side elevation of the present invention. Fig. 2 is a top plan view. Fig. 3 is a front elevation. Fig. 4 is a section on line 4 4 of Fig. 2 looking rearwardly.

Referring now to the drawings, the present invention comprises longitudinally-extending spaced runners 5, connected at their rearward ends by a cross member 6. A central member 7 is secured at its rearward end to the member 6 and has its forward portion turned to extend upwardly, as shown at 8, the upper end of this portion being connected with the runners 5 by means of diagonal members 9. A cross-brace 10 connects the runners 5 and the central member 7, and mounted upon the runners forwardly of this brace there is a transverse tooth-beam 11, having depending teeth 12, there being thus formed a harrow element. Rearwardly-divergent upwardly-extending handles 13 are connected with the central member 7 and extend rearwardly beyond the member 6, and by means of these handles the implement may be guided. Upwardly-extending handles 14 are carried by the rearward member 6 and may be grasped to lift the rearward end of the implement. A transverse beam 15 is mounted upon the runners adjacent to the rearward ends thereof and carries depending chopping-hoes 16, and mounted upon the upper end of the portion 8 of the central member there is a whiffletree 17 for the attachment of draft-animals to the implement.

It will be seen that in use the stalks will be struck by the member 11 and knocked and subsequently engaged and chopped by the hoes 16.

What is claimed is—

1. An implement of the class described comprising spaced runners, a connecting rear member, a longitudinally-extending central member having an upwardly-turned forward portion, said runners being connected at their forward ends with the upper end of said upwardly-turned portion, a whiffletree mounted upon the upwardly-turned portion, a tooth-beam mounted upon the runners, depending harrow-teeth carried by the beam, a transverse beam mounted upon the runners rearwardly of the first-named beam, depending hoes carried by the rearward beam, rearwardly and upwardly divergent handles connected with the central member, and upwardly-extending lifting-handles carried by the rearward member.

2. An implement of the class described comprising spaced longitudinally-extending runners, a connecting rearward member for the runners, a central member secured to the rearward member and extending forwardly beyond the runners and having its forward portion turned upwardly, diagonal connecting members between the upwardly-turned portion and the forward ends of the runners, a whiffletree mounted upon the upwardly-turned portion, a harrow element mounted upon the runners, a cross-brace for the runners and central member, a beam mounted upon the runners adjacent to their rearward ends and rearwardly of the harrow element, depending hoes carried by said beam, said harrow element being arranged to strike stalks in the path of the implement, guiding-handles for the implement, and lifting-handles for the implement.

In testimony whereof I affix my signature in presence of two witnesses.

RICHARD A. STUART.

Witnesses:
C. H. NEWBY,
A. H. RAGAN.